United States Patent
Gary et al.

(10) Patent No.: US 7,962,380 B2
(45) Date of Patent: Jun. 14, 2011

(54) WEBSITE ENABLING SELECTION OF CAMPS/ACTIVITIES FROM A PLURALITY OF PROVIDERS

(75) Inventors: Michele S. Gary, Austin, TX (US); Sarah A. Borders, Austin, TX (US)

(73) Assignee: G & B Group, LLC, Austin, TX (US)

( * ) Notice: Subject to any disclaimer, the term of this patent is extended or adjusted under 35 U.S.C. 154(b) by 414 days.

(21) Appl. No.: 12/163,499

(22) Filed: Jun. 27, 2008

(65) Prior Publication Data

US 2009/0018930 A1 Jan. 15, 2009

Related U.S. Application Data

(60) Provisional application No. 60/948,737, filed on Jul. 10, 2007.

(51) Int. Cl.
*G06Q 30/00* (2006.01)
(52) U.S. Cl. ............................. 705/27.1; 705/26.1
(58) Field of Classification Search .................. None
See application file for complete search history.

(56) References Cited

U.S. PATENT DOCUMENTS

| | | | | |
|---|---|---|---|---|
| 5,978,768 | A * | 11/1999 | McGovern et al. | 705/321 |
| 6,289,348 | B1 * | 9/2001 | Richard et al. | 1/1 |
| 7,069,300 | B2 * | 6/2006 | Toyota et al. | 709/206 |
| 2003/0182239 | A1 | 9/2003 | Auzoux | |
| 2006/0127870 | A1 * | 6/2006 | Fields et al. | 434/350 |
| 2006/0200754 | A1 | 9/2006 | Kablesh et al. | |
| 2006/0259311 | A1 | 11/2006 | Stadler et al. | |
| 2008/0052203 | A1 * | 2/2008 | Beyer et al. | 705/28 |
| 2008/0281710 | A1 * | 11/2008 | Hoal | 705/14 |
| 2009/0138450 | A1 * | 5/2009 | Richardson | 707/3 |

OTHER PUBLICATIONS

Pick a summer sports camp, any sports camp; Winnipeg Free Press; Jun. 9, 2007.*

* cited by examiner

*Primary Examiner* — Jeffrey A Smith
*Assistant Examiner* — Courtney Stopp
(74) *Attorney, Agent, or Firm* — Meyertons Hood Kivlin Kowert & Goetzel, P.C.; Jeffrey C. Hood

(57) ABSTRACT

A camp registration website and method for enabling a user to select camps offered by a plurality of providers. The camp registration website allows a user to search for, gather information regarding, and register for camps offered by a plurality of different providers. The camp registration web server may provide a master application to the user that is useable to apply for the various selected camps. The website may also maintain personalized information for a respective user, such as a personalized calendar for a respective user that stores date information regarding the camps selected by the user as well as local current events of interest. The web server may provide calendar information over the network to the user's client computer system to synchronize with a calendar program, such as Microsoft Outlook, Palm, etc., executing on a user device.

15 Claims, 13 Drawing Sheets

Master Application

Family Information

Parent/Guardian #1

First Name [ ]  Last Name [ ]
Address [ ]  City [ ]  State [ ]  Zip [ ]
Home Phone [ ]  Mobile Phone [ ]
Work Phone [ ]
Email Address [ ]
Preferred Contact Method [Home Phone]
Relationship to Camper  ☐ Mother  ☐ Father  ☐ Guardian

Parent/Guardian #2

First Name [ ]  Last Name [ ]
Address [ ]  City [ ]  State [ ]  Zip [ ]
Home Phone [ ]  Mobile Phone [ ]
Work Phone [ ]
Email Address [ ]
Preferred Contact Method [Home Phone]
Relationship to Camper  ☐ Mother  ☐ Father  ☐ Guardian

Emergency Contact Information

| Contact Name | Contact Relationship | Phone Number | Email |
|---|---|---|---|
|  |  |  |  |
|  |  |  |  |

Authorized Pickup List

| Contact Name | Contact Relationship | Phone Number | Email |
|---|---|---|---|
|  |  |  |  |
|  |  |  |  |
|  |  |  |  |
|  |  |  |  |

*FIG. 12*

Camper Information

Camper #1

First Name [ ]  Last Name [ ]
Camper Resides with  ☐ Mother  ☐ Father  ☐ Guardian
Date of Birth [ ]  Current Age [ ]  Gender [ ]  Entering Grade [ ]

Health Information

Physician Name [ ]  Physician Phone [ ]
Insurance Name [ ]  Insurance Verification Number [ ]
Allergies [ ]
Medication [ ]
Medical Notes [ ]

Enrollment

Camp Name [ ]  Camp Dates [ ]
Camp Name [ ]  Camp Dates [ ]

Camper #2

First Name [ ]  Last Name [ ]
Camper Resides with  ☐ Mother  ☐ Father  ☐ Guardian
Date of Birth [ ]  Current Age [ ]  Gender [ ]  Entering Grade [ ]

Health Information

Physician Name [ ]  Physician Phone [ ]
Insurance Name [ ]  Insurance Verification Number [ ]
Allergies [ ]
Medication [ ]
Medical Notes [ ]

Enrollment

Camp Name [ ]  Camp Dates [ ]
Camp Name [ ]  Camp Dates [ ]

Camper #3

First Name [ ]  Last Name [ ]
Camper Resides with  ☐ Mother  ☐ Father  ☐ Guardian
Date of Birth [ ]  Current Age [ ]  Gender [ ]  Entering Grade [ ]

Health Information

Physician Name [ ]  Physician Phone [ ]
Insurance Name [ ]  Insurance Verification Number [ ]
Allergies [ ]
Medication [ ]
Medical Notes [ ]

Enrollment

Camp Name [ ]  Camp Dates [ ]
Camp Name [ ]  Camp Dates [ ]

WEBSITE ENABLING SELECTION OF CAMPS/ACTIVITIES FROM A PLURALITY OF PROVIDERS

PRIORITY CLAIM

The present application claims benefit of priority of U.S. provisional application Ser. No. 60/948,737 titled "Website Enabling Selection of Camps/Activities from a Plurality of Providers" filed on Jul. 10, 2007, whose inventors are Michele S. Gary and Sarah Borders, which is hereby incorporated by reference as though fully and completely set forth herein.

FIELD OF THE INVENTION

The present invention relates to website software enabling a user to select and register for various camps offered by a plurality of different providers.

DESCRIPTION OF THE RELATED ART

People often need to register (e.g., register their children) for various types of camps, such as summer camps, including day camps, multi-day camps, etc. However, often it is difficult to find information regarding the various day camps that are available. It is also difficult to assess and compare the various camps that are offered in order to select the most appropriate camp. Further, registration for a plurality of different camps is often time consuming.

Therefore, it would be desirable to provide an improved website that provides updated information that is easily accessible and comparable for multiple different day camps in a geographic region. It would also be desirable to allow the user to register for various different camps simultaneously through the convenient use of a single application process, e.g., using a master application, thereby providing a time saving convenience to the user.

SUMMARY OF THE INVENTION

One embodiment of the invention comprises a camp registration website and method (sometimes referred to herein as "campzoom") for enabling a user to select camps offered by a plurality of providers. The system comprises a camp registration web server connected to a wide area network (WAN) such as the Internet. Using a client computer system also coupled to the Internet, a user can access the camp registration website. The camp registration website may allow a user to search for, gather information regarding, and/or register for camps offered by a plurality of different providers. Various camp provider servers may also couple to the camp registration web server through the Internet.

The camp registration web server provides a web page for display on the client computer system. The web page comprises information regarding a plurality of camps which are offered by a plurality of providers. A user may access the website over the Internet and specify search criteria for a desired camp. In response to the search criteria, the camp registration web server may perform a search of the camps maintained on the website (or otherwise stored/maintained, e.g., on other similar or associated websites) and provide the results to the user for display. The results may comprise a subset of camps, e.g., one or more camps, that fit the search criteria.

The user may also perform various types of analysis using the camp registration website. For example, the user may view the websites of various camp providers using links on the website. Also, the user may use a "buddy list" to view camps for which friends have registered. For example, the user may be able to view a personalized calendar which shows the various camps that friends on the "buddy list" have registered for.

The user may then select one or more camps based on the search results and/or the analysis performed. For example, the user may select one camp offered by a camp provider. Alternatively, the user may select a plurality of camps offered by a plurality of different camp providers.

The camp registration web server may then provide a master application to the user, wherein the master application is useable to apply for each of the camps the user has selected. In one embodiment, the master application may be useable to apply for any of the camps maintained on the website. The user can then fill out the information in the master application. A portion or all of the master application can then be provided to each of camp providers to register the user for the selected camps. In other words, the user-supplied information to the master application can be provided to each of the camp providers that the user has selected for registration. The master application may be provided to the provider in various ways, e.g., as a single application or segmented out to meet provider specific needs. For example, providers often are required to have certain information (such as health related) in a separate form.

The camp registration website may maintain personalized information for a respective user, which may include information regarding the various camps selected by the user, camps selected by the user in prior years, saved search results, calendar information, saved newsletters (e.g., from campzoom), saved private schools, saved private instructors, links to preferred camp providers, and/or other information the user may find helpful to have saved on the website. As part of this personalized information, in one embodiment, the website may maintain a personalized calendar for a respective user that stores information (e.g., relevant dates/times) regarding the camps selected by the user. The calendar may display the camps registered by the user, local upcoming events, vendor special events, camp provider special events, etc. The calendar may display different camps and/or events with different colors or other visual cues to visually indicate this information. In one embodiment, the calendar may be automatically populated with items of local interest, or items selected based on prior input from the user.

In one embodiment, the camp registration web server may provide calendar information over the network to the user's client computer system to synchronize with a calendar program executing on a user device. For example, the calendar information may be used to update the user's calendar application, such as Microsoft Outlook, Palm, etc. Thus the user can update the calendar application running on their personal computer, PDA, Blackberry™, iPhone™, smart phone, etc.

BRIEF DESCRIPTION OF THE DRAWINGS

A better understanding of the present invention can be obtained when the following detailed description of the preferred embodiment is considered in conjunction with the following drawings, in which:

FIGS. 4-14 are screenshots of a camp registration website according to various embodiments of the invention.

Figure 1:
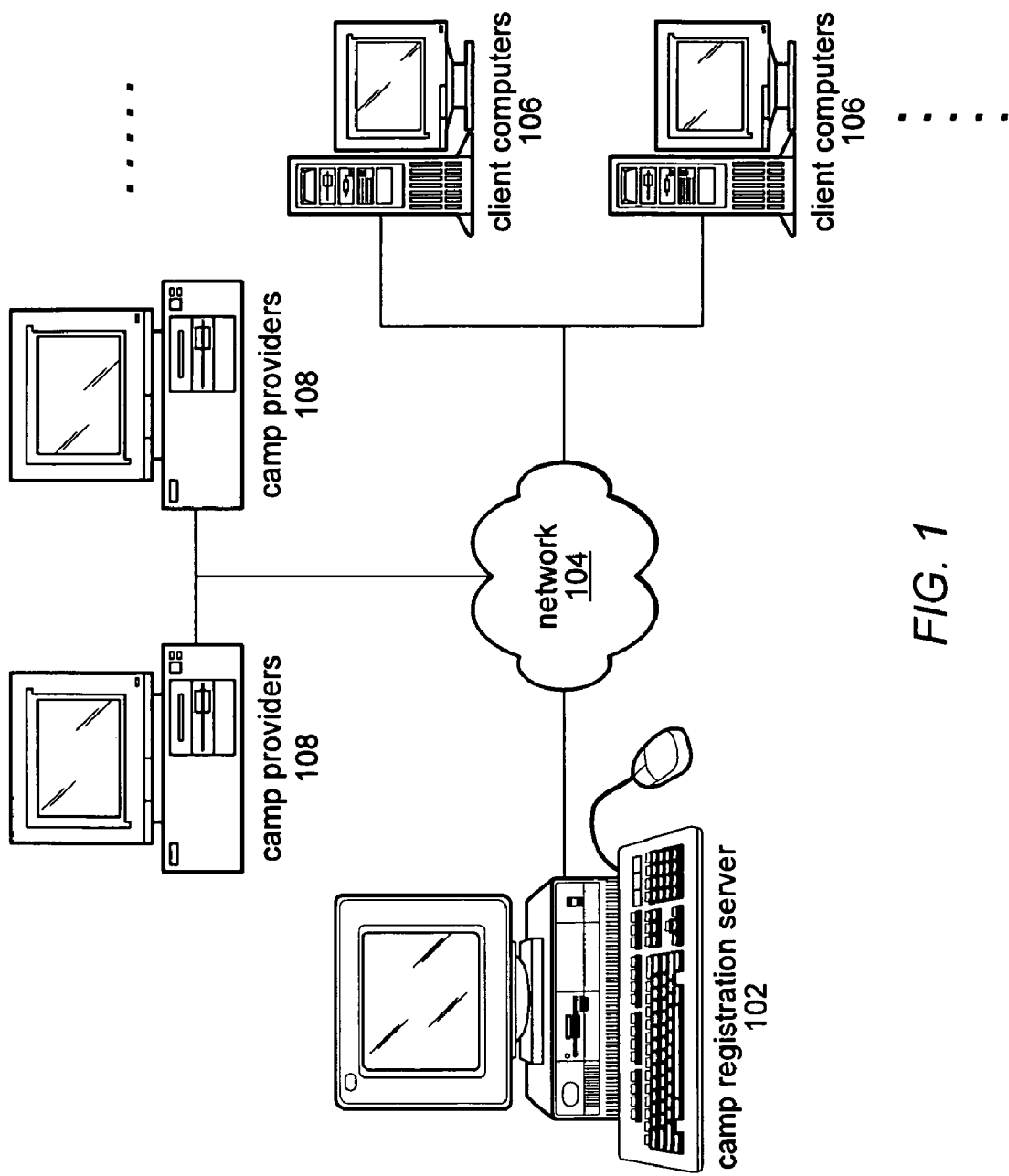
FIG. 1 illustrates a system for implementing a camp search and registration website according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Software Program—the terms "software program" or "program" are intended to have the full breadth of its ordinary meaning, and include any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output. Exemplary graphical user interface elements comprise input controls and output indicators Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium FIG. 1—Exemplary Computer Network FIG. 1 illustrates one embodiment of a system operable to implement various embodiments of the current invention. Note that various ones of the components/servers illustrated in FIG. 1 (or others) may be omitted or added as desired.

As shown, a camp registration server 102 may be connected through a network 104 to a plurality of various client computers 106. The client computers 106 may be operated by users who desire to register (or register their children) for various camps. One or more camp providers (camp provider servers) 108 may also be connected to the network 104. The network 104 is preferably a wide area network (WAN) such as the Internet, although various other wide area networks may be used. Various of the computers in FIG. 1 may couple through a local area network (LAN) to the wide area network 104.

The camp registration server 102 is preferably an Internet web server that is designed for serving web pages to client computers 106 that are also connected to the Internet 104. The camp registration server 102 may store software for enabling the server 102 to act as an Internet web server. The camp registration server 102 may also store camp registration website software, e.g., program instructions and/or data, that enables the camp registration server 102 to act as a camp registration website. Thus, the camp registration server 102 may store information on various camps, camp providers, etc. The camp registration server 102 may also store personalized information for various users of the website, including a personalized calendar, as discussed further below.

The camp registration server 102 may couple through the network 104 to various camp providers 108. As discussed further below, the camp registration server 102 may be operable to provide a master application (filled out by a user) to one or more camp providers 108 to facilitate registering for their respective camps. The camp registration server 102 may also update its information on the various camps using information obtained from the respective camp provider servers 108.

Figure 2:
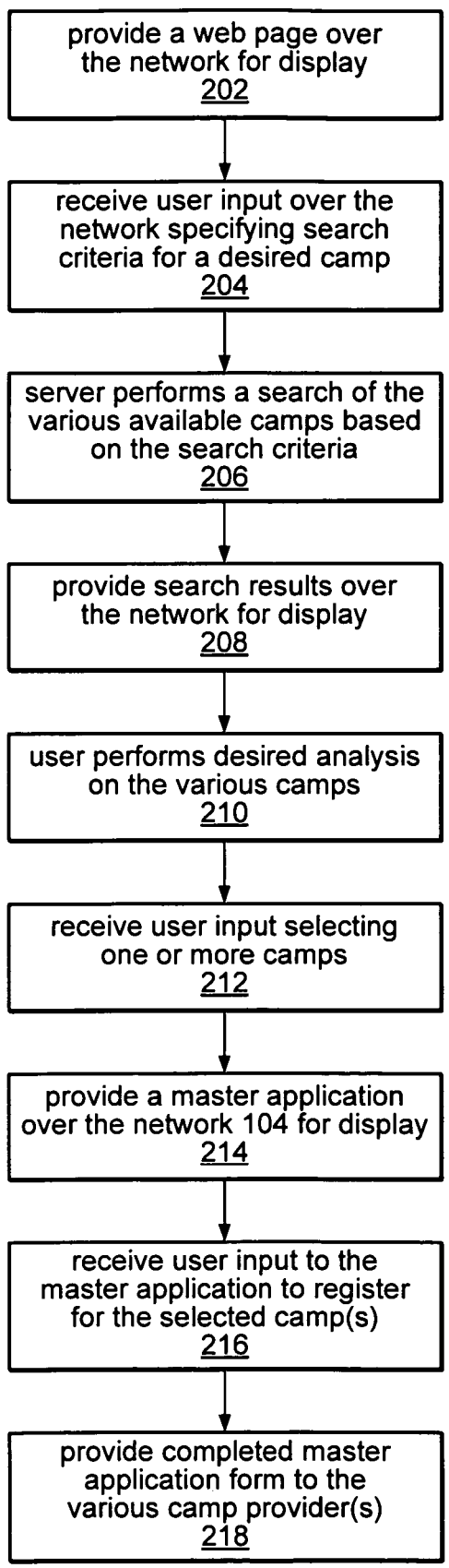
FIG. 2 is a flowchart illustrating an exemplary method for providing a camp search and registration website according to one embodiment of the present invention information for a part according to one embodiment.

FIG. 2—Exemplary Method for Providing a Camp Registration Website

FIG. 2 is a flowchart illustrating an exemplary method for providing a camp registration website. The method shown in FIG. 2 may be used in conjunction with any of the systems or devices shown in the FIG. 1, among other systems. In various embodiments, some of the method elements shown may be performed concurrently, in a different order than shown, or may be omitted. Additional method elements may also be performed as desired. As shown, this method may operate as follows.

In 202, a web page may be provided over the network 104 for display. For example, the camp registration server 102 may provide a webpage to a client computer system that is coupled to the Internet. The camp registration server 102 may provide the webpage in any of various formats, such as an HTML webpage, a Flash program that is downloaded to and which executes on the client computer 106, or other suitable methods for displaying images on a remote computer. The client computer system 106 may receive and display the webpage or on its display. A user may then interact with the displayed webpage to search for, obtain information regarding, and register for various camps, as well as perform various other operations, as described herein.

The web page may comprise information regarding a first plurality of camps that are offered by a plurality of different providers. Thus, the webpage may not limited be to camps offered by a single provider, but rather the webpage may include camps offered by various different providers. In one embodiment, the webpage is intended to be substantially comprehensive with respect to camps in a local geographic region.

In one embodiment, users may be charged a monthly or yearly fee to use the website. Alternatively, providers are required to pay a monthly or yearly fee for their information to appear on the camp registration webpage. In another embodiment, camp information of various providers appears on the website without requiring any user or provider payment. In this embodiment, the website may include various advertising to cover the cost of maintaining the website. The camps may be located in a local geographic region. As used herein, the term "local geographic region" refers to a city, metropolitan area, or region comprising two or more cities, wherein the region is sufficiently small such that local advertising can be maintained on the site. For example, an exemplary region may be central Texas, which includes the cities of Austin and San Antonio as well as cities in the surrounding hill country, Bastrop, Round Rock Georgetown, etc. An exemplary "local geographic region" may comprise an area of, e.g., 300 miles×300 miles, 200 miles×200 miles, 100 miles×100 miles, etc.

As used herein, the term "camp" refers to various types of day camps and overnight camps, such as day summer camps, overnight summer camps, etc, where a child may attend to engage in various activities. The term "camp" also refers to various types of camp activities, including academic camps such as chess, math pentathalon, creative writing, robotics, programming etc.; musical camps; theatre arts camps such as acting, dancing and comedy; art & crafts camps; gymnastics camps; etc. or indoor sports camps, such as day or multi-day basketball camps, volleyball camps; outdoor sports camps such as football camps, baseball camps, lacrosse camps, multi-sport camps; water sport camps, such as kayaking, rowing, swimming, etc.

In 204, the user may then provide input over the network specifying search criteria for a desired camp. For example, the camp registration website may provide a search page for display that has various fields for specifying search criteria. The user may provide various types of search criteria in order to search for a desired camp. For example, the user may provide search criteria such as camp type, camp provider, camp instructors, a date range, camp location, cost, single week or multi-week day camps, instructor experience level, provider years of operations, intructor/student ratio, camp or instructor accreditations, class size, age group, camper grade, hours of camp, provider type (private vs. public), special needs, religious affiliations, as well as other search criteria.

In response to the received search criteria, in 206 the server 102 may then perform a search of the various camps available on the website (the first plurality of camps), wherein the search is performed based on the search criteria. For example, the server 102 may determine the various camps that fit the search criteria entered by the user. For example, if the user has requested information on a single week volleyball camps during the month of July, the server 102 would provide information on all such camps. In one embodiment, the server 102 may also initiate searches on other server computer systems (e.g., provider servers 108) that are connected to the camp registration server 102.

In 208, the server 102 may provide resulting information over the network for display on the client computer system 106. The resulting information comprises information regarding a second plurality of camps, i.e., a subset of the first plurality of camps that were searched. This resulting information may then be displayed on the client computer system 106. The user may perform various different types of searches in order to determine the most appropriate camp based on her criteria. Thus, steps 204, 206, and 208 may be performed a plurality of times until the user is satisfied that she has found the most appropriate camp. In one embodiment, as the user is assessing the various camps offered, the user may select an option to compare the dates of one or more camps to information in a calendar application running on her computer system, to ensure that there are no date conflicts with existing items in her calendar.

In 210, the user may then perform any of various types of analysis on the various camps. For example, the camp registration web server 102 may include a page or location that comprises various user comments, posts, feedback, ratings, etc. regarding past experiences with the various camps. As part of the user's analysis, the user may optionally view the various comments or posts on this page.

In one embodiment, the user may maintain a "buddy list" of other users (or children of users), wherein the children on the "buddy list" desire to attend the same camps. The "buddy list" may be maintained as part of the user's "personalized information" maintained on the camp registration web site. Thus the "buddy list" may comprise names of child friends who desire to attend the same camps, or the "buddy list" may comprise the names of the respective parents. The camp registration web server 102 may display a calendar which illustrates the various camps being attended by children associated with the buddy list. The user can thus use this information to select the same camps in which certain other children are already enrolled.

The camp registration website may also comprise links to the websites of the various day and overnight camps maintained on the site. The user can use these links to explore the respective websites of the various camp providers.

After performing any desired searching and/or analysis in 201, in 212 the user may then provide input to the camp registration web server selecting one or more camps. It is noted that the user can select multiple camps offered by various different providers, as desired.

After the user has selected one or more camps for registration in 212, in 214 the camp registration web server 102 may provide a master application over the network 104 for display. In other words, the server 102 may provide the master application for display on the client computer system 106 or may provide the master application for download on to the client computer system 106. The master application is designed to be a camp registration application that is generic to a plurality of camps, and preferably all of the camps on the camp registration website. Thus, the master application is preferably designed to include information entry fields that are comprehensive with respect to most or all of the camps available on the website. Thus, the user may only be required to fill out a single application form to apply for registration to a plurality of different camps offered by a plurality of different providers. This may greatly simplify the registration or application process for the user.

In 216, the user may provide input to the master application to apply for or register for the various selected camps. The master application may be an interactive webpage. As such the user may simply type the various required information into the fields of the webpage. Upon confirmation of the selections, payment and agreement to the terms, the user will select submit, at which time the server will automatically submit the application to all selected camp providers along with payment on behalf of the user. The master application may also be presented as a downloadable form. If the master application is a downloaded form, the user can open up the form on his local computer 106, fill in the desired information, and then save the application back onto the camp registration server 102. In one embodiment, the user can provide the completed master application form to each of the various camp providers herself, either through e-mail or by regular mail.

In 218, the camp registration web server 102 may receive the completed master application form along with information regarding the desired camps and may provide a portion or all of the completed master application form to each of the various camp providers associated with the camps selected by the user. Provision of a portion or all of the completed master application form may also encompass providing the information entered by the user, possibly in various different formats for various providers. For example, if certain camp providers require specialized forms, the camp registration web server 102 may use the information entered by the user into the master application and provide this information in a format desired by the camp provider, e.g., by populating fields of a provider-specific application form with the information entered by the user into the master application.

Thus, in this embodiment, the user is not required to provide application forms for each of the various providers herself, but rather the server 102 can automatically provide the completed master application form (or a portion of the completed master application form) to each of the camp providers.

Figure 3:
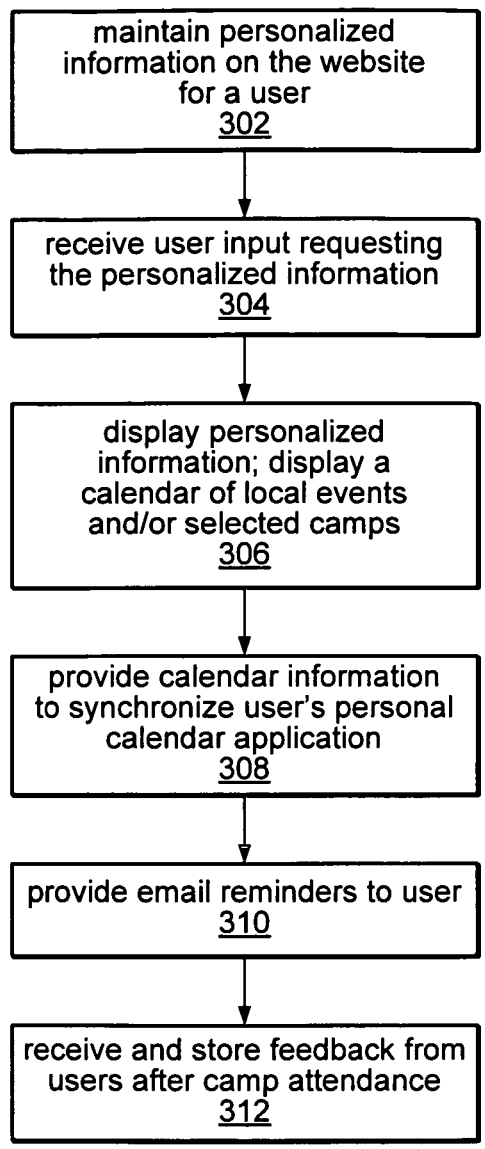
FIG. 3 is a flowchart illustrating operations performed using the camp registration website according to various embodiments.

FIG. 3 is a Flowchart Illustrating Another Exemplary Operation of the Website.

As shown, in 302 the camp registration web server 102 may operate to maintain personalized information on the website for each of a plurality of users, e.g., in the form of a "personal home page" or "personalized page". This personalized information may comprise information regarding the various camps selected by the user, camps selected by the user in prior years, saved search results, calendar information, saved newsletters (e.g., from campzoom), saved private schools, saved private instructors, links to preferred camp providers, and other information the user may find helpful to have saved on the website. As part of this personalized information, in one embodiment the website may maintain a personalized calendar for a respective user that stores date information regarding the camps selected by the user.

In one embodiment, as noted above, the user may maintain a "buddy list" of children that desire to attend the same camps. Camps attended by children on the buddy list may appear on the personalize calendar of a respective user. Thus, the user can confirm that her child is attending the same camps being attended by the child's friends.

In 304, when a user accesses her personal information (or personal web page) on the website, in 306, the server 102 may display the various personalized information noted above.

The user may also be able to view the personalized calendar which illustrates the camps that have been selected by the user. In other words, the website may provide the calendar over the network 104 for display on the client computer system 106.

The various camps displayed on the calendar may be displayed with different colors, patterns, etc. to visually indicate the user different types of camps. For example, athletic camps may be displayed with a blue-collar, whereas general-purpose camps may be displayed with a green color. Alternatively, the various camps displayed on the calendar may be displayed with different colors, patterns etc. dependent on the particular child attending the camp. For example, if a first camp is being attended by a first child "Henry", the camp may be displayed with a blue color on the calendar, whereas they camp attended by a second child "Susan", they can may be displayed with a pink color on the calendar. In one embodiment, camps reserved by various different children on the "buddy list" may appear on the calendar in one or more different colors, patterns, etc. to visually indicate to the user the camps being attended by different children on the buddy list. In one embodiment, only registered camps will be shown on a user's calendar and the registered camps will all be categorized by the same color. Color cues will be for general type of event. For example, camp start date—yellow, family local event—green, adult local event—blue, local vendor special event—red, etc.

In one embodiment, the personalized calendar is automatically populated with other local items of interest. Thus, the personalized calendar may include items displayed on the calendar that the user has not previously selected, but rather are items of general interest. In one embodiment, the user may customize her "homepage" or "personalized information page" to select areas of personal interest. Activities or items that conform to the selected area of personal interest may then be automatically populated on the calendar. For example, the user may select a category of family events, and the personalize calendar may be automatically populated with all of the various family events that are occurring in the local geographic region.

In one embodiment, after the user has selected one or more camps, in 308 the user may choose to receive calendar information from the camp registration Web server 102. This calendar information may be used to update or synchronize a calendar application running on an electronic device operated by the user with the dates of the camps selected by the user. Thus, the user can have their personal calendaring software such as Microsoft Outlook, Palm, etc. updated with the dates of the selected camps. For example, the user can update the calendar application running on their local computer system 106 or personal digital assistant device, smart phone, Blackberry or other handheld device with the calendar information of the various camps that have been selected. This provides a much easier way for the user to keep track of the camps for which the user has registered. The calendar information provided by the server can also include instructions for the respective calendar application being updated to provide reminders prior to the start of the camp so that the user does not forget to have their child attend the respective camp.

As shown at 310, the camp registration Web server 102 may also be configured to provide various e-mail reminders to the user to remind the user of the start dates of the camps that have been selected. The user may be able to configure the server 102, e.g., using the personalized information page, with the desired number and/or frequency of reminders that the user desires to receive.

At 312, once the user's child has attended a particular camp, the user may log on to the registration website and post comments and/or feedback regarding their child's experience at the camp. As noted above, these comments on the post page are viewable by other parents considering respective camps. This feedback page may provide a valuable tool for users and selecting the appropriate camps for their children.

FIGS. 4-13 are exemplary screen shots illustrating operation of the camp registration server web site according to one embodiment.

Figure 4:

FIG. 4 illustrates the CampZoom Home page according to one embodiment, which shows the various services offered by the CampZoom website according to one embodiment.

Figure 5:
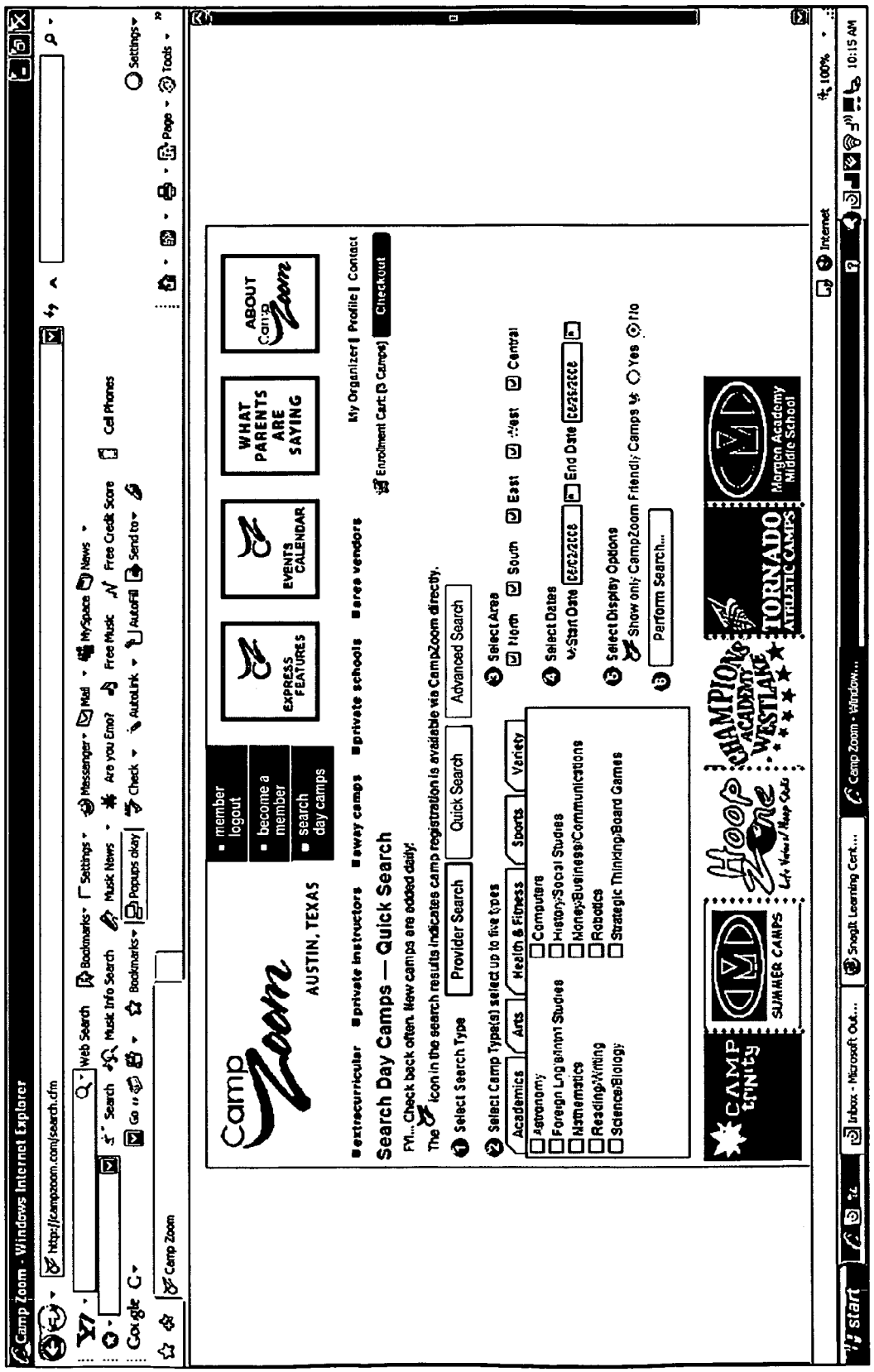

FIG. 5 illustrates the CampZoom search page, where the user has selected "Provider Search".

Figure 6:
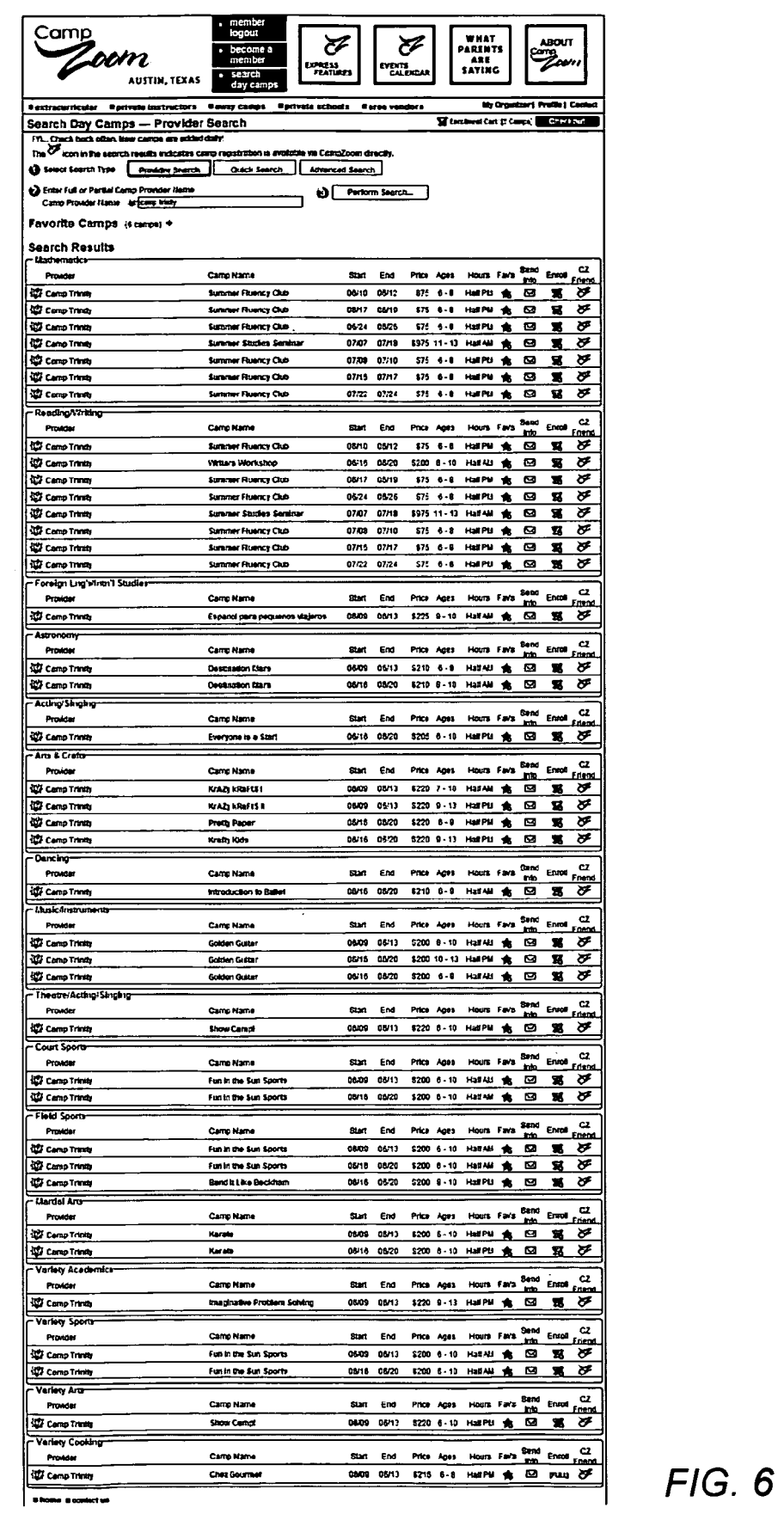

FIG. 6 illustrates search results for a "Provider search". Here the user has entered "Camp Trinity" into the search page as the Provider. Here note that the Search Results on the web page include various Camp Trinity events.

Figure 7:
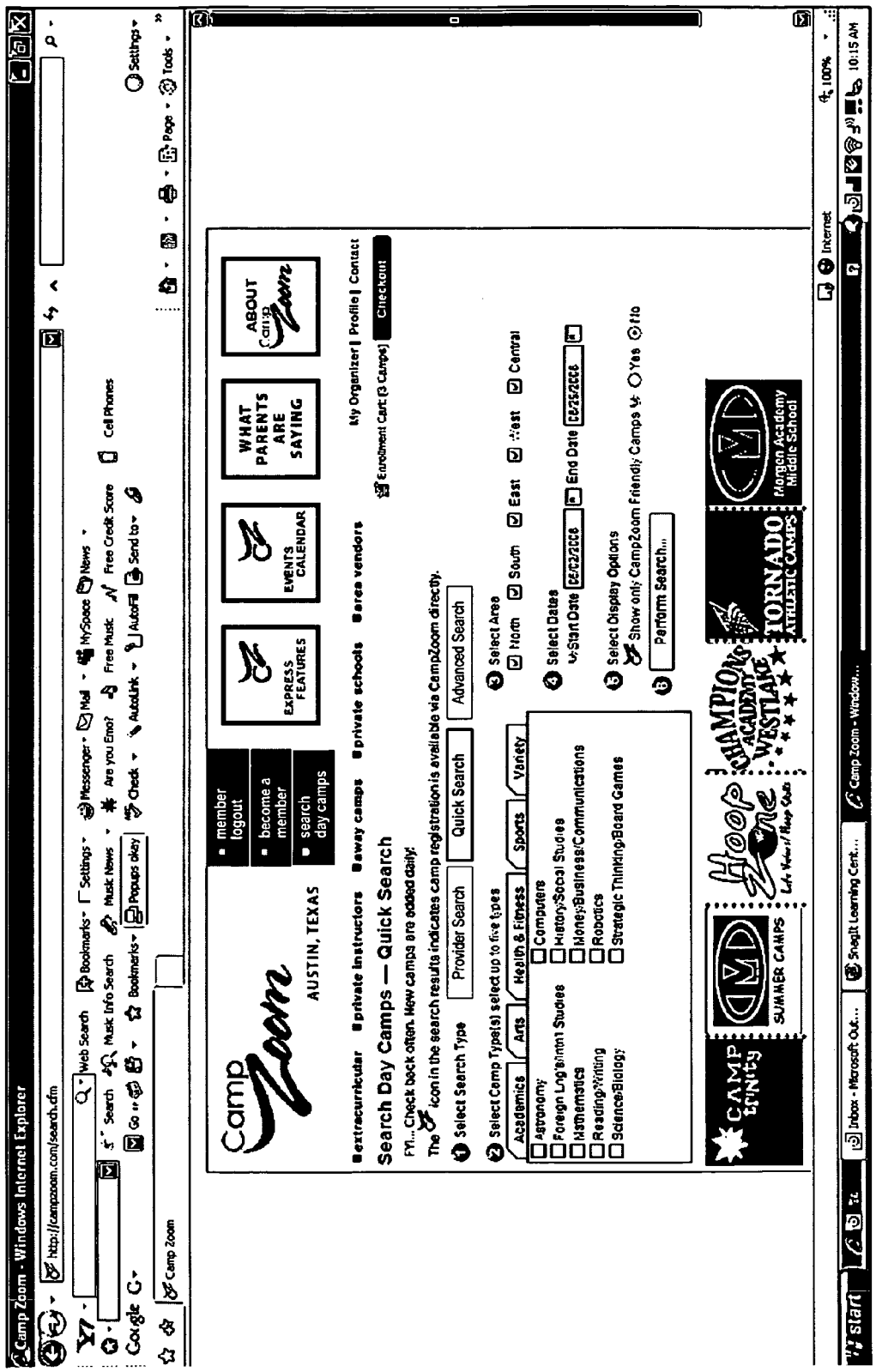

FIG. 7 illustrates the CampZoom search page, where the user has selected "Quick Search".

Figure 8:
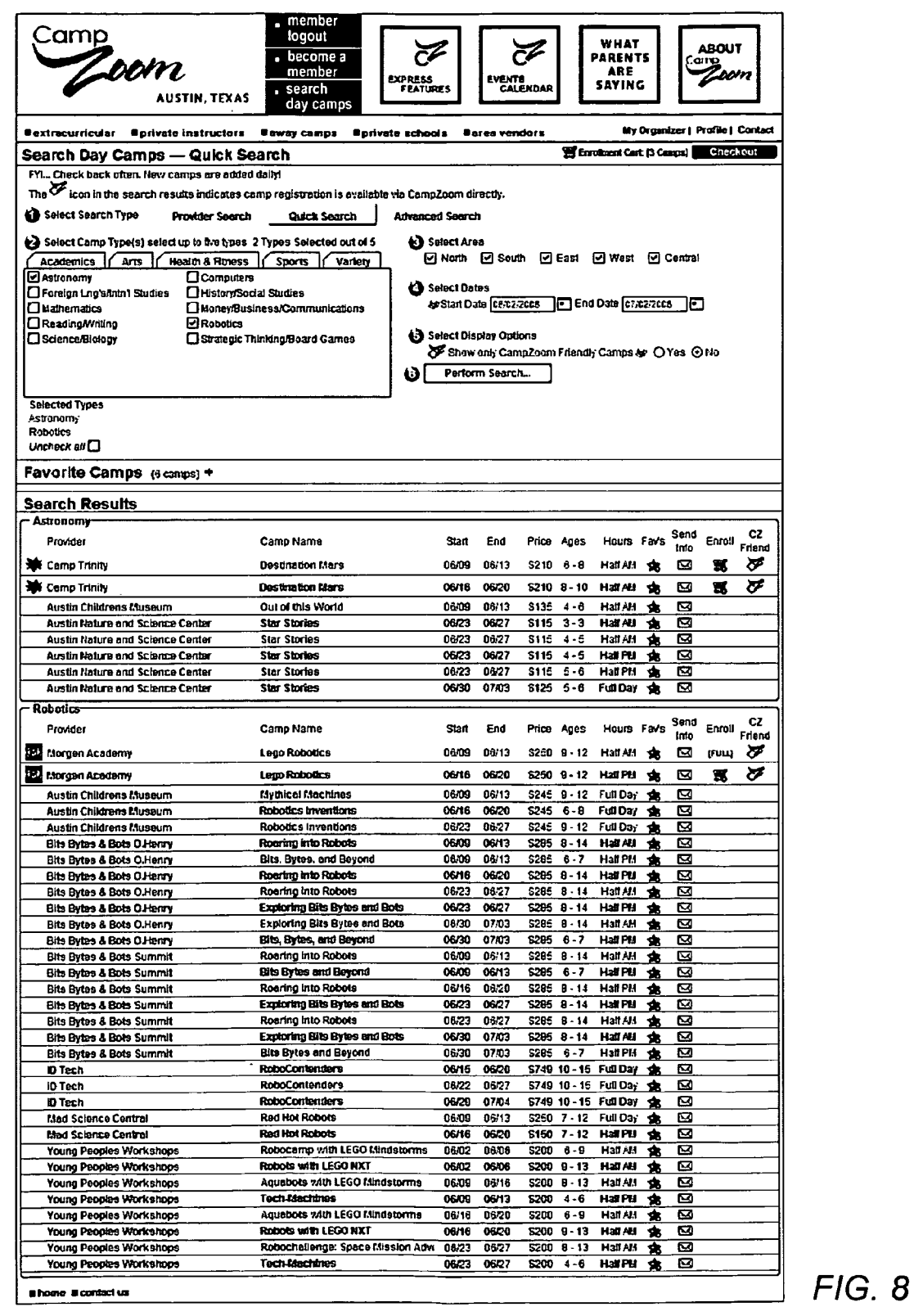

FIG. 8 illustrates search results for a "Quick Search". In FIG. 8 the user has specified "Astronomy" and "Robotics" as the search criteria, has selected all areas (North, South, East, West, and Central) and has provided a date range. This exemplary "Quick Search" returns the results shown in FIG. 8.

Figure 9:
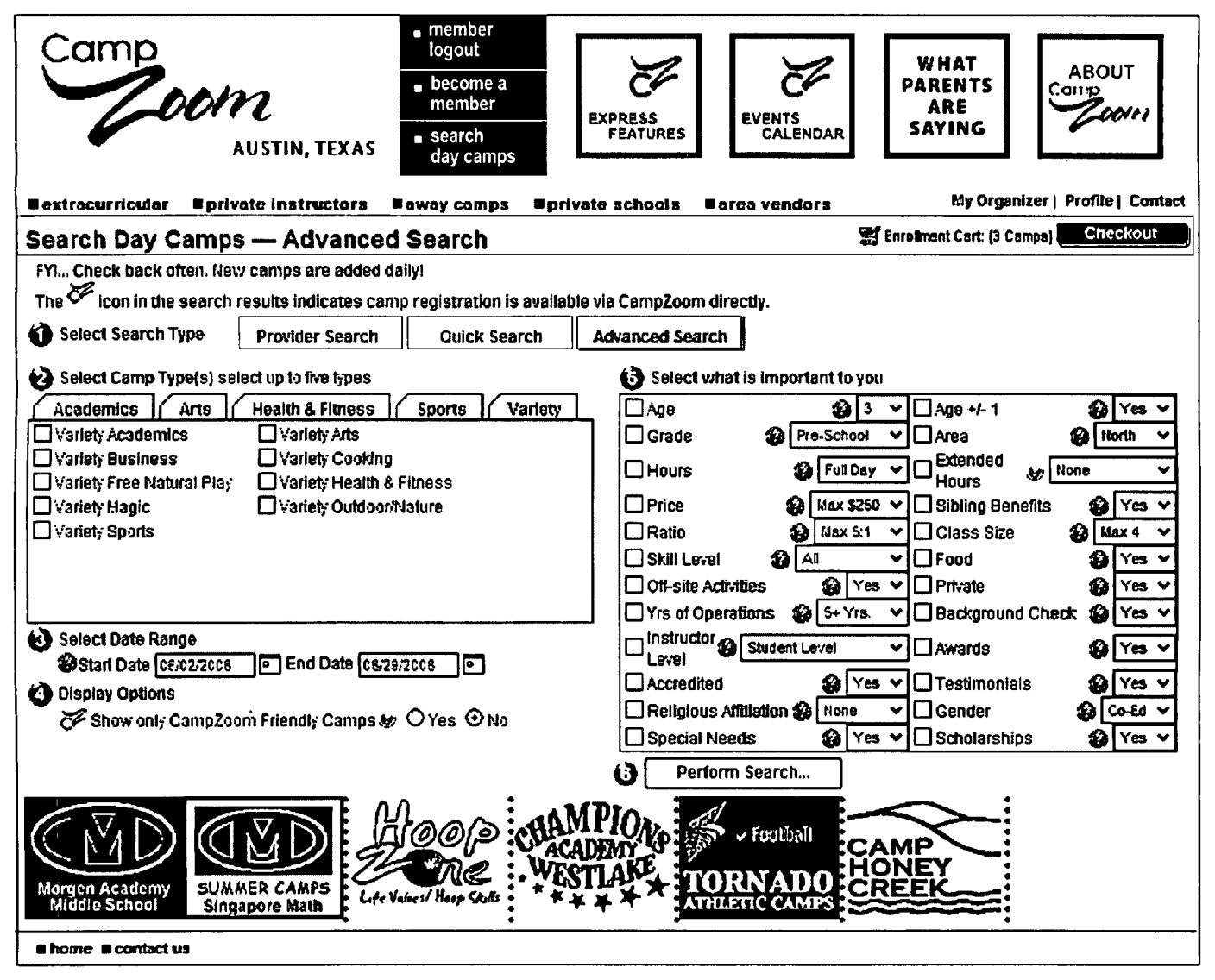

FIG. 9 illustrates the CampZoom search page, where the user has selected "Advanced Search". As shown, this exemplary embodiment of the Advanced Search page has 27 search criteria and 43 unique camp type categories.

Figure 10:
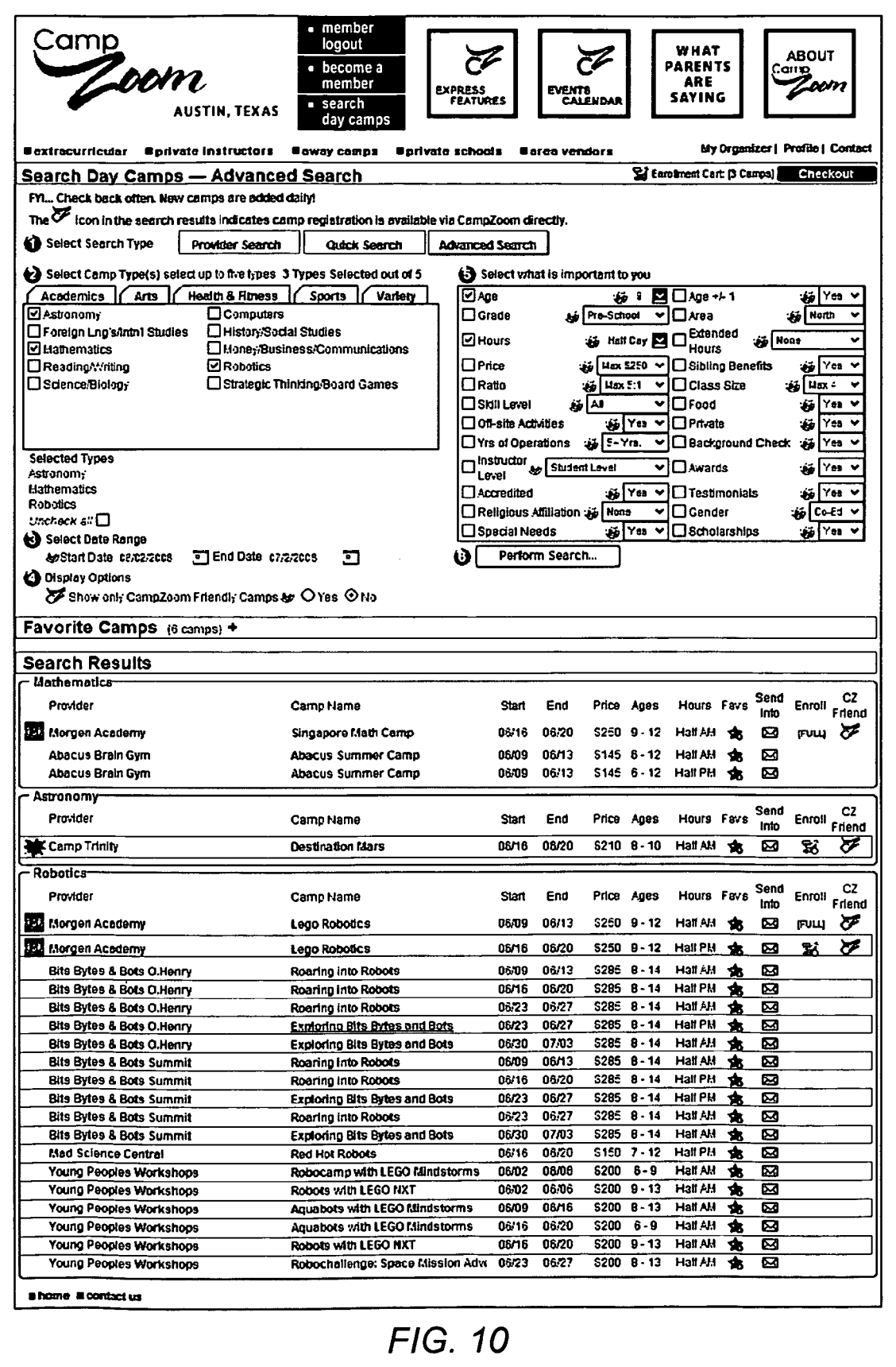

FIG. 10 illustrates search results for an "Advanced Search". In FIG. 10 the user has specified "Astronomy", "Mathematics", and "Robotics" as the primary search criteria and has provided a date range. Note that when an "Advanced Search" is selected, the user can select various additional parameters, such as: Age, Grade, Hours, Price, Ratio, Skill Level, Off-site Activities, Yrs of Operations, Instructor Level, Accreditation, Religious Affiliation, Special Needs, Age ±1, Area, Extended hours, Sibling Benefits, Calss Size, Food, Private, Background Check, Awards, Testimonials, Gender, and Scholarships. This exemplary "Advanced Search" returns the results shown in FIG. 7.

Figure 11:
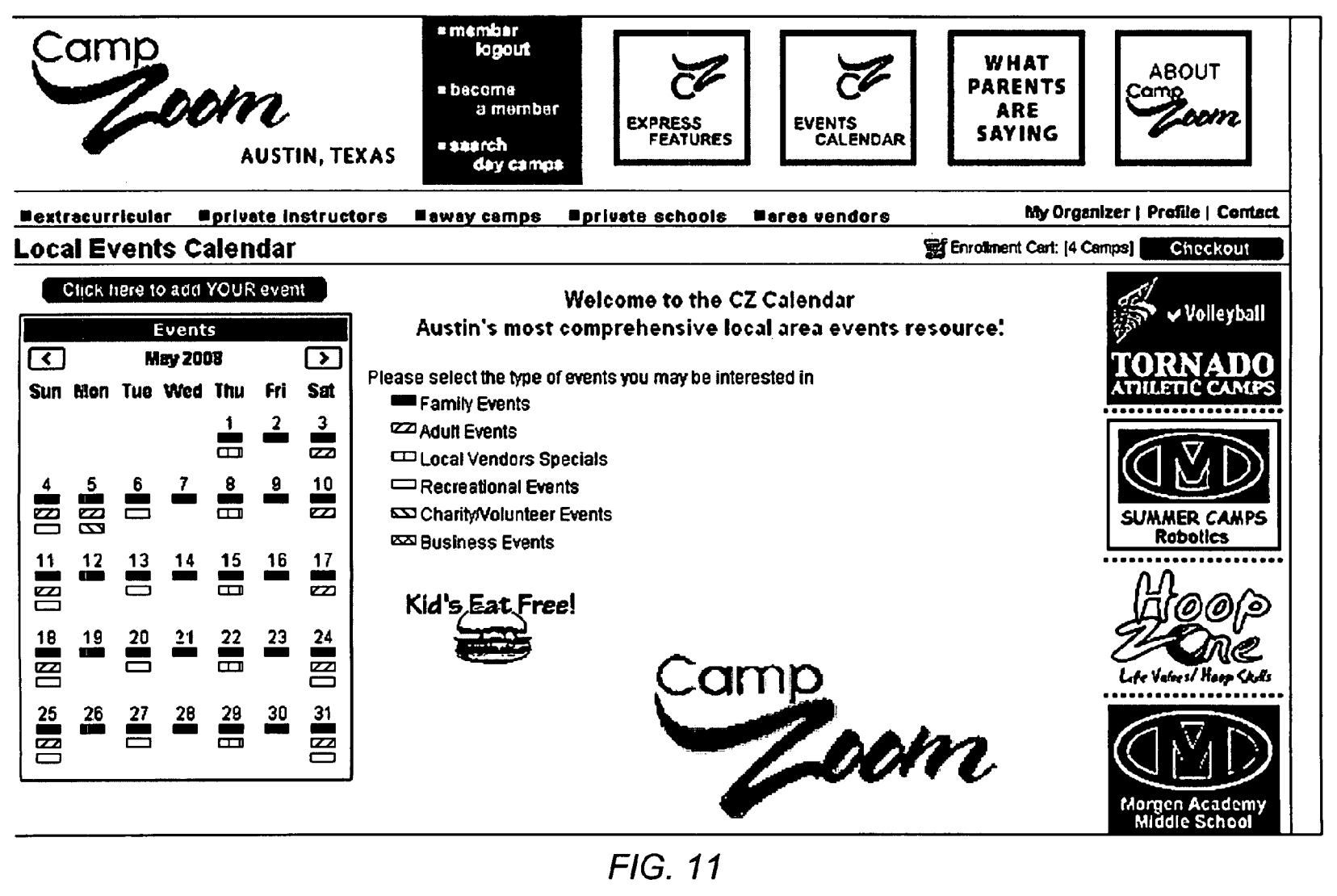

FIG. 11 illustrates the CampZoom Local Events Calendar web page. The Local Events Calendar visually indicates various types of events by using either color coding, patterns, shading, etc. In the preferred embodiment, the calendar is color coded, whereby different colors indicate different event types. This color coding is represented in FIG. 11 by different shadings (as color drawings are not allowable in patent application submissions). Thus, as shown, each category or type of events such as Family Events, Adult Events, Local Vendors Specials, Recreational Events, Charity/Volunteer Events, and Business Events may each have different may use is color coded. Thus events which appear on the calendar of a respective type have a respective color that corresponds to the event type. This allows the user the convenience of scanning the calendar for events based on color (and hence event type) and more easily discerning events of interest without having to read through large amounts of (potentially non-interesting) listings.

FIG. 12 illustrates a CampZoom Master Application. This Master Application may be presented to a user who desires to register for one or more camps. As shown, the Master Application has various user information fields.

FIG. 13 illustrates a Camper Information form, where information can be provided regarding the "camper", e.g., the child who will be attending a selected camp.

Figure 14:
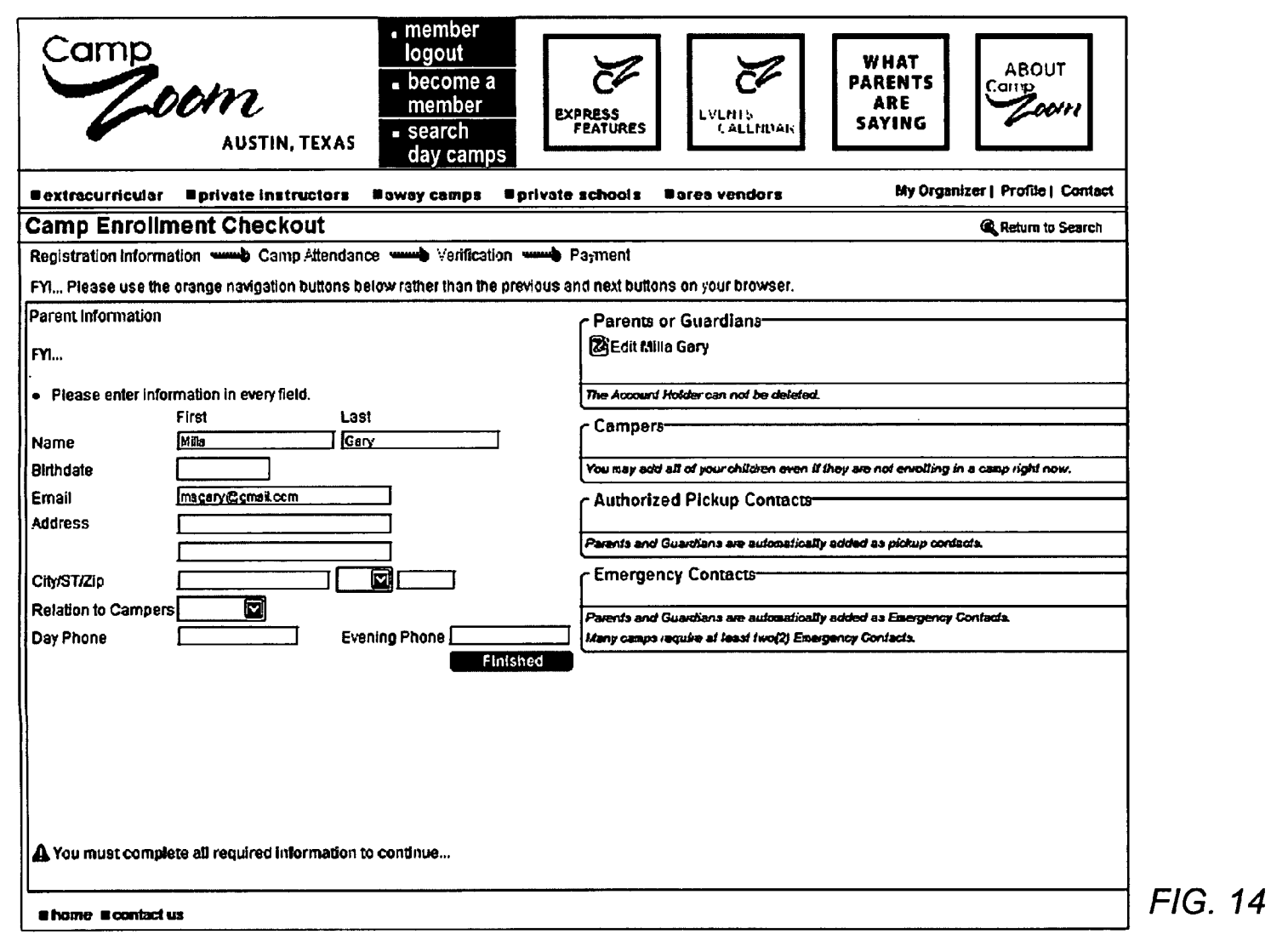

FIG. 14 illustrates a Camp Enrollment Checkout screen. As shown, the user may be required to provide Parent Information, Camper Information, Authorized Pickup Contacts, and Emergency Contacts, among others. The website may also provide for verification and payment, as shown.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for enabling a user to select camps offered by a plurality of providers, the method comprising: providing a first web page over a network for display, wherein the first web page comprises information regarding a first plurality of camps, wherein the first plurality of camps are offered by a plurality of providers; receiving user input over the network specifying search criteria for a desired camp; performing a search of the first plurality of camps based on the search criteria; providing information over the network for display, the information regarding a second plurality of camps based on said searching, wherein the second plurality of camps are selected from the first plurality of camps based on the search criteria; receiving user input over the network selecting a first camp from the second plurality of camps, wherein the first camp is offered by a first provider; providing a master application over the network for display, wherein the master application is useable to apply for each of the first plurality of camps; receiving user input providing user information to the master application for application to the first camp; providing at least a portion of the master application over the network to the first provider, thereby requesting registration for the first camp.

2. The method of claim 1, further comprising:
   maintaining a calendar for a respective user of the first web page, wherein the calendar stores date information regarding the first camp;
   providing the calendar over the network for display, wherein the calendar visually displays the date information regarding the first camp.

3. The method of claim 2, wherein the calendar includes two or more camps of different types;
   wherein the calendar displays the two or more camps with different colors to visually indicate the different types.

4. The method of claim 2, further comprising:
   automatically populating the calendar with one or more items of local interest.

5. The method of claim 1, wherein the network is the Internet.

6. The method of claim 1, further comprising:
   storing personalized information for each user; and
   providing the personalized information over the network for display.

7. The method of claim 6, wherein the personalized information comprises two or more of:
   saved camps;
   saved newsletters;
   saved private schools; or
   saved private instructors.

8. The method of claim 1, further comprising:
   providing calendar information over the network to a client computer system operated by the user;
   wherein the calendar information is useable to synchronize with a calendar program executing on a user device.

9. The method of claim 8, wherein the calendar information includes color coded information to visually indicate types of camps displayed in the calendar.

10. The method of claim 8, where the calendar information automatically includes information of local interest.

11. The method of claim 8, wherein the user device is one of the client computer system or a personal digital assistant operated by the user.

12. The method of claim 1, further comprising:
providing calendar information over the network to a client computer system operated by the user;
wherein the calendar information is useable to synchronize with a calendar program executing on a personal digital assistant operated by the user.

13. The method of claim 1, wherein the first plurality of camps are located in a local geographic region.

14. A computer-implemented method for enabling a user to select camps offered by a plurality of providers, the method comprising: providing a first web page over a network for display, wherein the first web page comprises information regarding a first plurality of camps, wherein the first plurality of camps are offered by a plurality of providers; receiving user input over the network specifying search criteria for a desired camp; performing a search of the first plurality of camps based on the search criteria; providing information over the network for display, the information regarding a second plurality of camps based on said searching, wherein the second plurality of camps are selected from the first plurality of camps based on the search criteria; receiving user input over the network selecting a third plurality of camps from the second plurality of camps, wherein each of the third plurality of camps is offered by a different provider; providing a master application over the network for display, wherein the master application is useable to apply for each of the first plurality of camps; receiving user input providing user information to the master application for application to the third plurality of camps; providing the user information over the network to each of the different providers, thereby requesting registration for the third plurality of camps.

15. A computer-implemented method for enabling a user to select camps offered by a plurality of providers, the method comprising: providing a first web page over a network for display, wherein the first web page comprises information regarding a first plurality of camps, wherein the first plurality of camps are offered by a plurality of providers; receiving user input over the network selecting a second plurality of camps, wherein the second plurality of camps includes a first camp and a second camp, wherein the first camp is offered by a first provider, and wherein the second camp is offered by a second provider; providing a master application over the network for display, wherein the master application is useable to apply for each of the second plurality of camps; receiving user input providing user information to the master application for application to the first camp; providing at least a portion of the master application over the network to the first provider thereby requesting registration for the first camp and to the second provider thereby requesting registration for the second camp.

* * * * *